United States Patent [19]

Armor et al.

[11] 4,051,400
[45] Sept. 27, 1977

[54] END GAS GAP BAFFLE STRUCTURE FOR REVERSE FLOW COOLED DYNAMOELECTRIC MACHINE

[75] Inventors: Anthony F. Armor; David H. Winne, both of Schenectady, N.Y.

[73] Assignee: General Electric Company, Schenectady, N.Y.

[21] Appl. No.: 655,392

[22] Filed: Feb. 5, 1976

[51] Int. Cl.² .................................................. H02K 9/00
[52] U.S. Cl. ........................................ 310/58; 310/53
[58] Field of Search ....................... 310/52, 53, 55, 58, 310/59, 60, 61–65, 256

[56] References Cited

U.S. PATENT DOCUMENTS

| | | | |
|---|---|---|---|
| 2,313,899 | 3/1943 | Smith | 310/63 |
| 2,991,337 | 7/1961 | Vose | 310/61 |
| 3,348,081 | 10/1967 | Willyoung | 310/55 |
| 3,413,499 | 11/1968 | Barton | 310/58 |
| 3,714,477 | 1/1973 | Gott | 310/256 |
| 3,739,208 | 6/1973 | Shartrand | 310/58 |
| 3,886,387 | 5/1975 | Graham | 310/256 |

*Primary Examiner*—R. Skudy
*Attorney, Agent, or Firm*—John F. Ahern; Herbert E. Messenger; James W. Mitchell

[57] ABSTRACT

A reverse flow cooled dynamoelectric machine is provided with an annular baffle disposed in the gap thereof and spaced from stepped core laminations at the end region for improving the cooling of those laminations. The baffle directs a flow of cooling gas across the laminations increasing the velocity of the flow. The baffle is mounted on the stator and comprises an annular member of electrically non-conducting material having a generally triangular cross section with a rounded nose. The baffle may be formed from a plurality of arcuate segments for ease of installation.

13 Claims, 4 Drawing Figures

END GAS GAP BAFFLE STRUCTURE FOR REVERSE FLOW COOLED DYNAMOELECTRIC MACHINE

BACKGROUND OF THE INVENTION

This invention relates to a reverse flow cooled dynamoelectric machine and more particularly to an improved arrangement for cooling the end regions of the stator of a reverse flow cooled dynamoelectric machine.

DESCRIPTION OF THE PRIOR ART

Dynamoelectric machines, such as large turbine-generators, typically are cooled by a gas such as hydrogen flowing through the interior of the rotor, through the gas gap between the rotor and stator, and through passages between the stator laminations. The stator windings may or may not be primarily cooled by a liquid flowing within the windings themselves. The gas flow through the laminated stator core serves to cool the laminations by removing the heat associated with eddy current and hysteresis losses. The heat generated in the stator core at the end regions thereof and particularly in the "teeth" thereof, presents a particular problem since more heat per unit volume is produced in the end laminations than the central laminations due to the leakage flux at the ends of the machine. In the past, the "teeth" of the end laminations were effectively cooled by gas from the fan impinging directly on the "teeth" and thereby effecting good heat transfer. This cooling scheme, of pumping cooling gas from a gas cooler, through the fan, the rotor end regions, the core and laminations and back to the gas coolers, is known as forward flow ventilation.

However, as the ratings of large turbine-generators increased, it was found that the heating produced in the end regions of the generator rotors became a limiting factor of the capability of these machines. In order to cool these localized areas of excessive heating in the generator rotors, a reverse flow cooling scheme was adopted wherein cooling gas was pumped by the fan first to a gas cooler, the flow then being divided, a portion of it being pumped into the rotor at an end region thereof to cool the rotor, and the remainder of the gas being pumped through the cooling passages of the stator core. Such a reverse flow ventilation scheme is shown in U.S. Pat. No. 3,739,208 to Shartrand, assigned to the assignee of the present invention. However, in such a reverse flow cooling scheme the gas employed to cool the end regions of the stator no longer impinges directly on the end "teeth," since it flows out of, rather than into, the gap. Therefore, the heat build-up in the end regions of the stator becomes a limiting factor in the output capability of the reverse flow cooled generator.

This deficiency of prior art reverse flow cooling arrangements has been overcome in the present invention wherein a portion of the cooling gas flow is directed over the end regions of the stator at an increased velocity thereby more effectively cooling these regions. This more effective cooling is achieved in a manner which minimizes fluid losses in the flow of cooling gas over the end regions of the stator. Furthermore, the integrity of certain flow zones in the gas gap is enhanced in the present invention thereby improving the performance of the entire cooling system. The means by which the cooling gas is directed over the end regions of the stator also directs a portion of the cooling gas close to the generator rotor which imparts a rotational velocity component to the flow of cooling gas thereby adding energy to the flow and thus by means of improved fans, further improving the performance of the cooling system. Finally, the present invention provides a means by which excess cooling gas flow in certain cooling passages is prevented thereby improving the performance of the cooling system still further.

Therefore, it is an object of the present invention to provide a reverse flow cooled dynamoelectric machine wherein cooling gas is directed over the end stator core laminations at a velocity sufficient to effectively cool those laminations.

It is another object of the present invention to provide a reverse flow cooled dynamoelectric machine wherein such cooling of the end stator core laminations is effected while at the same time minimizing the attendant fluid losses in the flow of cooling gas over the end stator core laminations.

It is another object of the present invention to provide a reverse flow cooled dynamoelectric machine wherein such cooling of the end stator core laminations is accompanied by an enhanced integrity of flow zones in the gas gap.

It is another object of the present invention to provide a reverse flow cooled dynamoelectric machine wherein the cooling of the end stator core laminations is accompanied by an addition of energy of the flow of cooling gas to improve the performance of the dynamoelectric machine cooling system.

It is another object of the present invention to provide a reverse flow cooled dynamoelectric machine wherein the means for cooling the end stator core laminations prevents excess cooling gas flow in certain core cooling passages to improve the performance of the dynamoelectric machine cooling system.

SUMMARY OF THE INVENTION

These and other objects apparent from the following detailed description taken in connection with the appended claims and the accompanying drawings are attained by providing an annular baffle spaced from and generally concentric with the end regions of a dynamoelectric machine stator core. The baffle is of a generally triangular cross section with a rounded nose for minimizing pressure losses associated with the flow of cooling gas around the baffle. The baffle may be constructed from a plurality of arcuate segments for ease of installation in the dynamoelectric machine. In a preferred embodiment of the invention, the baffle is mounted to outside space blocks of the dynamoelectric machine stator. In operation, cooling gas exiting the gap between the rotor and stator is channeled by the baffle into a directed flow over the end regions of the dynamoelectric machine stator core thereby increasing the velocity of cooling gas flowing over these regions for more effective cooling thereof. The baffle also directs a flow of cooling gas close to the rotor which imparts a rotational velocity component to the flow, thereby adding energy to the flow and thus further improving the performance of the cooling system.

DESCRIPTION OF THE PREFERRED EMBODIMENT

Figure 1:
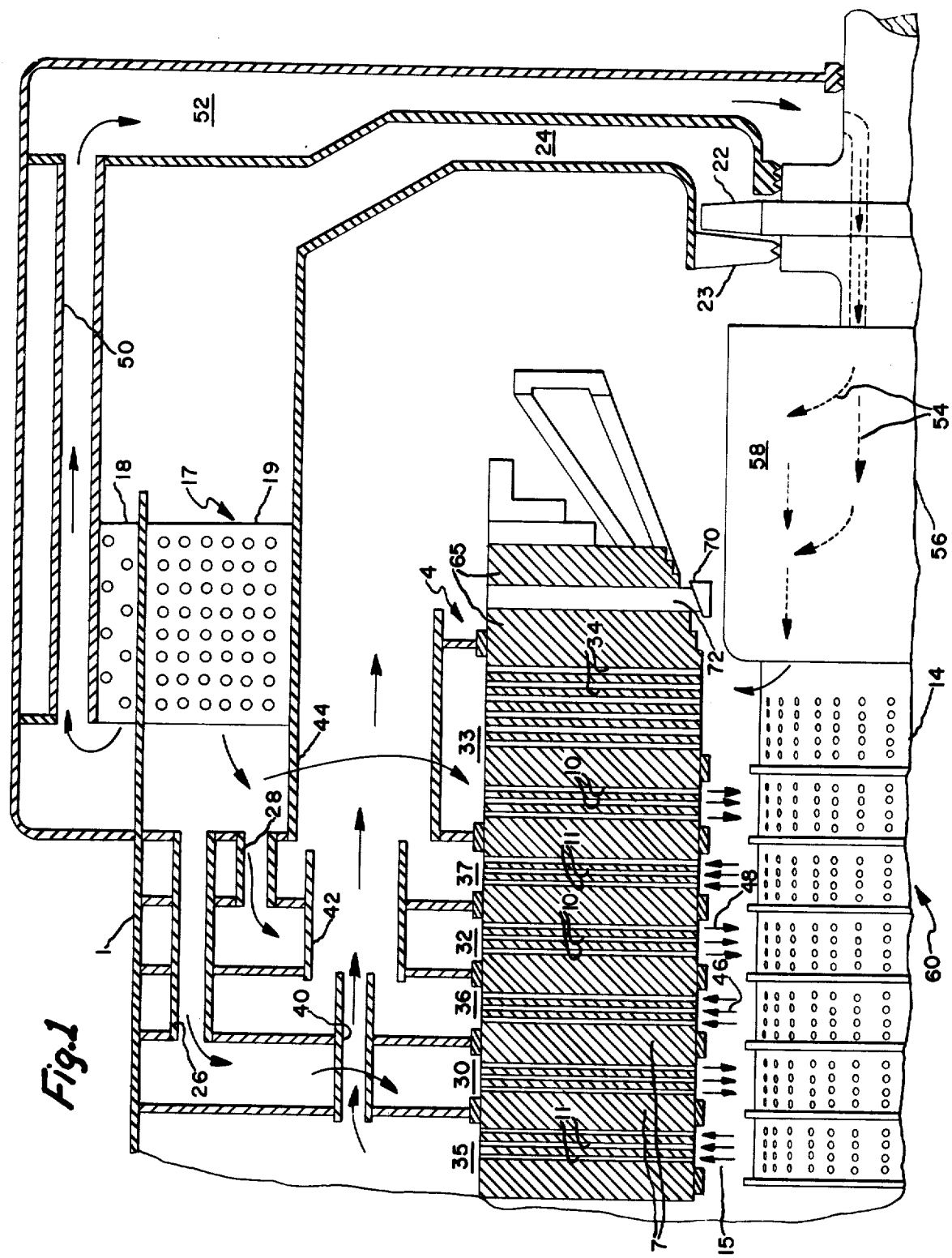
FIG. 1 is an elevated view in partial section of one end of a reverse flow cooled turbine-generator employing the improved cooling arrangement of the present invention.

FIG. 1 illustrates one end of a reverse flow cooled turbine-generator similar to that disclosed in U.S. Pat. No. 3,739,208 to Shartrand. The generator includes a gas-tight casing 1 pressurized with a cooling gas such as hydrogen. A stator 4 comprising a core formed from a plurality of stacked laminations assembled in packages 7 is disposed in casing 1. The details and reason for stacked laminations at the end of the stator core are discussed in U.S. Pat. No. 3,714,477 to Gott, assigned to the instant assignee. A plurality of axially spaced radially extending cooling passages 10 and 11 are defined by the laminations and accommodate a flow of gas therethrough for the cooling of the core. Passages 10 conduct cooling gas through the core in a radially inward direction. Passages 11 conduct the gas through the core in a radially outward direction. The turbine-generator also includes a rotating field enclosed in a rotor 14 which is disposed within stator 4 and spaced therefrom by a gas gap 15. A gas cooler 17 divided into upper and lower sections 18 and 19, respectively, is also provided within casing 1. A fan 22 is attached to rotor 14 and draws cooling gas from gap 15 through a series of inlet guide vanes one of which is shown at 23, pumping the cooling gas to cooler 17 through duct 24.

For the cooling of stator 4, ducts 26 and 28 communicating with lower section 19 of cooler 17 provide passages for the flow of cooling gas from the cooler to inlet chambers 30 and 32, respectively. From these chambers, gas is pumped to the gap and the rotor through cooling passages 10. A third inlet chamber 33 communicating directly with the lower section 19 of cooler 17 feeds gas to axially outer cooling passages 34.

Cooling gas is pumped outwardly through cooling passages 11 in stator 4 from gap 15 and exhausts from those cooling passages to outlet chamber 35, 36 and 37 and to tubes 40, 42 and 44 which direct this gas back to fan. Therefore, it can be seen that gap 15 is divided into outlet flow zones one of which is shown at 46 and inlet flow zones one of which is shown at 48. The outlet flow zones are those zones through which cooling gas is pumped from the rotor to cooling passages 11. The inlet flow zones are those zones through which the gas is pumped from cooling passages 10 to the rotor.

For the cooling of rotor 14, a tube 50 is provided within casing 1 in communication with the upper section 18 of cooler 17 and with a conduit 52 which leads to the end of rotor 14. Rotor 14 is provided with an inner longitudinal passage 54 which communicates with conduit 52 and gap 15 and provides for the conduction of cooling gas between these areas to cool end turn region 56 of the rotor. A retaining ring 58 is shrink-fitted on rotor 14 to hold the field coil end turns in place under operating conditions. Rotor 14 includes a body portion 60 cooled by gas picked up from gap 15 in a manner disclosed in U.S. Pat. No. 3,348,081 to D. M. Willyoung, assigned to the assignee of the present invention. Gas is pumped through cooling passages in the body portion 60 of rotor 1 through internal diagonal cooling passages machined within the field windings, a suitable construction being disclosed in U.S. Pat. No. 2,986,664 to D. M. Willyoung and P. A. Becker which is assigned to the assignee of the present invention.

In operation, cooling gas is pumped by fan 22 through conduit 24 and through cooler 17. That portion of the gas pumped through lower section 19 of cooler 17 is fed to inlet chambers 30 and 32 through ducts 26 and 28, respectively, around tubes 40 and 42. Cooling gas is provided at inlet chamber 33 directly from the outlet of cooler 17 by flowing around tube 44. From the inlet chambers 30, 32 and 33, the cooling gas passes through the stator cooling passages 10 communicating therewith, through gap 15 and is picked up by rotor 14. The rotation of the rotor provides a pumping action of cooling gas through the field coils as described in the aforementioned patents. After flowing through the field coils, the cooling gas exits the rotor to the gap where it is forced through cooling passages 11 in the stator core to outlet chambers 35, 36 and 37. The gas is conducted from these outlet chambers through tubes 40, 42 and 44 back to the inlet of fan 22.

To cool the end turn region 58 of rotor 1, gas is pumped by fan 22 through upper section 18 of cooler 17, through tube 50 and conduit 52 internal longitudinal passages represented generally by arrows 54 in rotor 1. This cooling gas exits rotor 1 in the gap 15 below cooling passages 34 and is drawn into fan 22 which pumps it to cooler 17.

Figure 2:
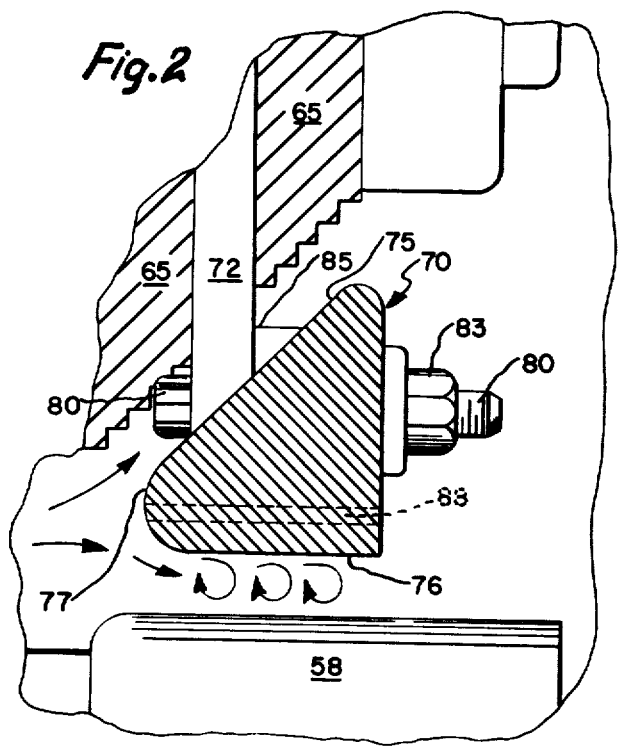
FIG. 2 is an enlarged view of the end region of the turbine-generator of FIG. 1.
Figure 4:
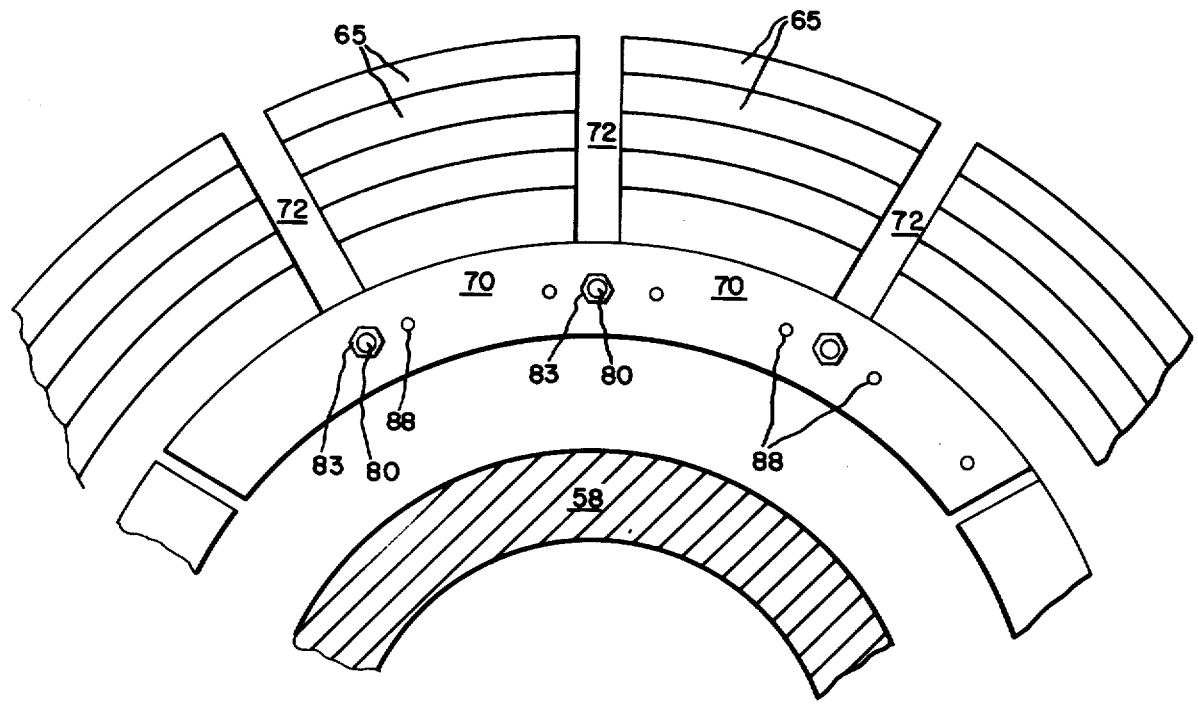
FIG. 4 is an enlarged end view of a portion of the turbine-generator shown in FIG. 1.

FIGS. 1, 2 and 4 show that the end region of stator 4 comprises a series of stepped laminations 65. It can be seen that the gas available for cooling this end region (that gas being drawn into the fan from the end of gap 15) has already picked up substantial amounts of heat from the stator and the rotor before flowing past these laminations.

Figure 3:
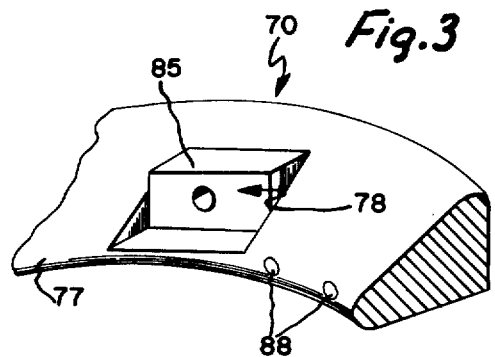
FIG. 3 is a perspective view of a portion of the baffle employed in the present invention.

In accordance with the present invention, as illustrated in FIGS. 2, 3 and 4, an annular baffle 70 fixed to stator 4 at outside space blocks 72 is provided in gap 15 between the stepped laminations 65 and retaining ring 58 to increase the heat transfer from those laminations to the cooling gas. In order to more effectively cool stepped laminations 65, baffle 70 directs large quantities of cooling gas drawn into fan 22 from gap 15 into impingement with those laminations increasing the velocity of that impinging cooling gas.

U.S. Pat. No. 3,413,499 is issued Nov. 26, 1968, to Barton discloses a baffle disposed in the same general area of a dynamoelectric machine as the baffle of the present invention. However, the baffle of the aforementioned patent is useful only in forward flow cooled dynamoelectric machines being employed therein to eliminate any interference between the radial flow of cooling gas between the rotor and stator and the axial flow of cooling gas pumped into the gap by the fan. The baffle of the present invention is specifically constructed for use in reverse flow cooled dynamoelectric machines and acts to enhance the cooling of the end stator laminations of such machines by turning an axial flow of cooling gas into impingement with those laminations. These differences in the purposes and functions of the baffle of the aforementioned patent and the baffle of the present invention emphasize the structural dissimilarities between these devices.

FIGS. 2, 3 and 4 show the baffle of the present invention in a larger scale and greater detail. In cross section baffle 70 is generally triangular and includes an outer face 75 spaced from and generally parallel to the stepped inboard edges of laminations 65 and an inner face 76 spaced from and generally parallel to the surface of retaining ring 58. Baffle 70 also includes a rounded nose 77 to direct the flow of cooling gas to the area between stepped laminations 65 and outer face 75. Rounded nose 77 is also provided to minimize any pressure losses associated with the flow of cooling gas around baffle 70. Since the baffle of the present invention reduces the flow area in that portion of gap 15 where it is situated, the flow of cooling gas directed across stepped laminations 65 is increased in velocity thereby providing a more effective cooling of those end laminations than was attainable in prior art reverse flow cooled generators. Outer face 75 is provided with a number of recessed portions, one of which is shown at 78 each of which accommodates the inner edge of an outside space block 72 for the mounting of the baffle. The baffle is mounted on space blocks 72 with bolts, one of which is shown at 80 and mating nuts, one of which is shown at 83. An integral mounting block 85 is disposed at the downstream end of each recess 78 and provides a flat contiguous mounting surface with the downstream face of the corresponding space block 72. Baffle 70 may be formed from a continuous annular member, or may comprise a plurality of arcuate segments which when mounted to space blocks 72 form an annular baffle (FIG. 4). By forming baffle 70 from a plurality of such arcuate segments, ease of installation within the generator may be enhanced.

Baffle 70 may be formed from any suitable material which can withstand the pressure forces associated with the flow of cooling gas. In a preferred embodiment, baffle 70 is formed from an electrically non-conducting substance such as a laminated fiber material sold under the trademark Textolite available from General Electric Company, Schenectady, N.Y. Such materials prevent any induced heating in the baffle which might otherwise result from the high concentration of stray flux in the end region of the generator. To prevent the delamination of any such materials employed in baffle 70, a plurality of dowels 88 are provided in the baffle each extending from nose 77 to the downstream face of the baffle.

Although the primary benefit of the baffle of the present invention is the elimination of excessive heating of the end regions of the stator cores of modern reverse flow-cooled generators, this baffle also enhances the performance of the generator cooling system in other areas. As best seen in FIG. 2, that portion of the cooling gas drawn into the fan from gap 15 which is not directed over the stepped laminations 65 is turned by nose 77 and directed toward retaining ring 58. The rotation of retaining ring 58 imparts a rotational component of velocity to the cooling gas drawn into fan 22 through the passage between the baffle and the retaining ring. In effect, this adds energy to the gas flow. A series of suitable guide vanes at the inlet to fan 22 such as that shown at 23 in FIG. 1, enables the fan to convert this rotational component of velocity pressure into useful static pressure thereby enhancing the performance of fan 22 and increasing the effectiveness of the entire cooling system. Moreover, the restriction in the flow of cooling gas from the gap 15 to the fan provided by baffle 70 causes a reduction in the axial velocity of the cooling gas in the gap upstream from the baffle of the present invention. In modern generators, it is important that the inlet and outlet areas in the gap be segregated as much as possible; that is for effective cooling, gas discharged from the cooling passages of the stator core and pumped into the rotor from the gap must remain substantially isolated from an adjacent flow of cooling gas from the rotor through the gap to the cooling passages in the stator core. By reducing the axial velocity of the cooling gas in the gap upstream of the baffle the integrity of these separate inlet and outlet areas in the gap is maintained thereby further enhancing the performance of the cooling system. Moreover, by reducing the axial velocity of the cooling gas in the gap, excess flow through cooling passages 34 (FIG. 1) in the stator core is prevented thereby eliminating a condition which would otherwise tend to reduce the flow of cooling gas through the other stator cooling passages and impair the cooling of the axially inner regions of the machine.

Therefore, it can be seen that the reverse flow cooled dynameoelectric machine disclosed herein includes an effective means of cooling the end region laminations of the stator core thereby eliminating the heat retentivity of those laminations as a limiting factor in the capability of such machines. Moreover, the performance of the entire cooling system is enhanced by the increased static pressure at the fan outlet effected by the impartation of a rotational velocity component to the gas flow in the gap by the retaining ring. A restriction in the axial flow of cooling gas in the gap also helps to maintain the integrity of the various inlet and outlet zones of the gap and also prevents the flow of cooling gas in the cooling passages in the end regions of the stator from reducing the flow of cooling gas in other cooling passages and thus impairing the cooling of the axially inner regions of the machine.

While there has been shown and described a specific embodiment of the reverse flow cooled dynamoelectric machine of the present invention, it will be apparent to those skilled in the art that modifications may be made without departing from the substance of this invention and it is intended by the appended claims to cover such modifications as come within the spirit and scope of this invention.

We claim:

1. A reverse flow cooled dynamoelectric machine comprising:
   a gas-tight casing containing cooling gas;
   a stator disposed within said casing and including a core of stacked laminations having axially spaced radially extending cooling passages disposed therein, the end regions of said core comprising radially foreshortened laminations with inboard ends progressively farther removed from the axis thereof providing an array of progressively stepped laminations;
   a rotor disposed within said stator and spaced therefrom by a gas gap;
   fan means disposed in said casing for the reverse flow circulation of the cooling gas; and,
   a baffle disposed in said gap and spaced from said stepped laminations for directing a flow of cooling gas flowing axially outwardly from said gas gap to said end regions across said stepped laminations and for increasing the velocity of flow of cooling gas across said stepped laminations and said baffle includes an annular member having outer face spaced from and generally parralell to the inboard edtes of said stepped laminations.

2. The dynamoelectric machine in claim 1, wherein said baffle includes an annular member of generally triangular cross section having an outer face spaced from and generally parallel to the inboard edges of said stepped laminations.

3. The dynamoelectric machine of claim 2, wherein said baffle has a rounded nose for directing a flow of cooling gas between said outerface and said stepped laminations while minimizing the pressure losses associated with the flow of cooling gas around said baffle.

4. The dynamoelectric machine of claim 3, wherein said baffle is formed from an electrically non-conducting material.

5. The dynamoelectric machine of claim 4, wherein said electrically non-conducting material is a laminated fiber material.

6. The dynamoelectric machine of claim 5, wherein said baffle further includes a plurality of dowels disposed therein for preventing the delamination of said laminated fiber material.

7. The dynamoelectric machine of claim 2, further including a plurality of space blocks supported on said stator and wherein said baffle includes a plurality of recesses, an end of each of said space blocks being received in a corresponding one of said recesses for mounting said baffle to said stator.

8. The dynamoelectric machine of claim 7, wherein said annular member is formed from a plurality of arcuate segments for ease of installation.

9. The dynamoelectric machine of claim 3, wherein said gas gap includes alternating zones of inlet and outlet cooling gas flow to and from said radially extending cooling passages and said baffle restricts the axial flow of cooling gas through said gas gap for maintaining the integrity of said alternating zones of inlet and outlet cooling gas flow in said gas gap.

10. The dynamoelectric machine of claim 3, wherein said baffle includes an inner face spaced from and generally parallel to said rotor, a portion of the axial flow of cooling gas through said gas gap being directed between said inner face and said rotor, said rotor imparting a component of rotational velocity to said gas flow, increasing the energy of said gas flow to enhance the overall cooling of said dynamoelectric machine.

11. In a reverse flow cooled dynamoelectric machine of the type having a gas-tight casing containing cooling gas, a stator core, the ends of which comprise radially foreshortened laminations with inboard ends progressively farther removed from the axis thereof providing an array of progressively stepped laminations, a rotor disposed within said stator core and spaced therefrom by a gas gap, and fan means for the reverse flow circulation of cooling gas in said casing, the improvement comprising:

a baffle disposed in said gap and spaced from said stepped laminations for directing a flow of cooling gas flowing axially outwardly from said gas gap to said fan over said stepped laminations and for increasing the velocity of the flow of cooling gas over the stepped laminations and said baffle includes an annular member having an outer face spaced from and generally parallel to the inboard edges of said stepped laminations.

12. The combination of claim 11, wherein said baffle is of generally triangular cross section having an outer face spaced from and generally parallel to said stepped laminations and having a rounded nose for directing a flow of cooling gas between said stepped laminations and said outer face while minimizing the pressure losses associated with the flow of cooling gas around said baffle.

13. The combination of claim 12, further including a plurality of space blocks supported on said stator and wherein said baffle comprises a plurality of arcuate segments each segment including a plurality of recesses, one end of each of said space blocks received in a corresponding one of said recesses for mounting said baffle to said space blocks.

* * * * *